US012768403B2

(12) United States Patent
Chollet et al.

(10) Patent No.: US 12,768,403 B2
(45) Date of Patent: Oct. 20, 2026

(54) BEARING DEVICE WITH INTEGRATED ELECTRIC INSULATION, IN PARTICULAR FOR AN ELECTRIC MACHINE OR MOTOR, AND ASSOCIATED MANUFACTURING METHODS

(71) Applicant: AKTIEBOLAGET SKF, Gothenburg (SE)

(72) Inventors: Mickael Chollet, Joué-Lès-Tours (FR); Anthony Simonin, Tours (FR); Benoit Arnault, Saint-Cyr-sur-Loire (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 19/212,817

(22) Filed: May 20, 2025

(65) Prior Publication Data

US 2026/0085726 A1 Mar. 26, 2026

(30) Foreign Application Priority Data

May 27, 2024 (FR) ....................................... 2405383

(51) Int. Cl.
*F16C 41/00* (2006.01)
*F16C 33/58* (2006.01)
(Continued)

(52) U.S. Cl.
CPC ............ *F16C 41/00* (2013.01); *F16C 33/586* (2013.01); *F16C 35/067* (2013.01); *H02K 5/173* (2013.01)

(58) Field of Classification Search
CPC ........ F16C 27/06; F16C 27/066; F16C 41/00; F16C 2202/24; F16C 2208/10–14;
(Continued)

(56) References Cited

U.S. PATENT DOCUMENTS 3,447,846 A * 6/1969 Marsh .................. F16C 27/066 384/536
2021/0164518 A1* 6/2021 Feliciano ............. F16C 33/586
(Continued)

FOREIGN PATENT DOCUMENTS

| | | | |
|---|---|---|---|
| EP | 2114801 | B1 | 5/2014 |
| GB | 1528404 | A | 10/1978 |
| JP | 2005320983 | A | 11/2005 |

OTHER PUBLICATIONS

Preliminary Search Report from the French Patent Office dated Nov. 14, 2024 in related French application No. FR2405383, including Search Report and Written Opinion.

*Primary Examiner* — John Olszewski
*Assistant Examiner* — Aimee Tran Nguyen
(74) *Attorney, Agent, or Firm* — J-TEK LAW PLLC; Scott T. Wakeman; Mark A. Ussai

(57) ABSTRACT

A bearing device includes a bearing having first and second rings configured to rotate relative to each other about a central axis, a bushing, and an electrically insulating insert overmolded between and connecting the bushing and a second radial side of the second ring. A surface of the bushing facing the second ring includes at least one groove extending circumferentially around a groove axis, at least one rib of the electrically insulating insert extends into the at least one groove, and the at least one groove axis is radially offset from the central axis.

12 Claims, 8 Drawing Sheets

(51) Int. Cl.
*F16C 35/067* (2006.01)
*H02K 5/173* (2006.01)

(58) Field of Classification Search
CPC ...... F16C 19/06; F16C 35/067; F16C 35/063; F16C 35/06; F16C 35/04; F16C 35/073; F16C 35/07; F16C 33/586; F16C 2202/30; F16C 2202/32; H02K 5/173
See application file for complete search history.

(56) References Cited

U.S. PATENT DOCUMENTS

| | | | |
|---|---|---|---|
| 2023/0220874 | A1 | 7/2023 | Arnault et al. |
| 2023/0220881 | A1 | 7/2023 | Arnault et al. |
| 2023/0220882 | A1 | 7/2023 | Arnault et al. |
| 2023/0223813 | A1 | 7/2023 | Arnault et al. |

* cited by examiner

BEARING DEVICE WITH INTEGRATED ELECTRIC INSULATION, IN PARTICULAR FOR AN ELECTRIC MACHINE OR MOTOR, AND ASSOCIATED MANUFACTURING METHODS

CROSS-REFERENCE

This application claims priority to French patent application no. 2405383 filed on May 27, 2024, the contents of which are fully incorporated herein by reference.

TECHNOLOGICAL FIELD

The present disclosure relates to the field of bearings that are used in particular in electric motors, electric machines and associated equipment.

BACKGROUND

In an electric machine or motor, at least one rolling bearing is mounted between the casing of the electric machine or motor and the rotary shaft in order to support this shaft. In operation, when the shaft is rotating, a difference in electric potential may arise between the latter and the casing of the electric machine or motor, generating an electric current between the inner ring of the rolling bearing which is connected to the shaft, and the outer ring which is connected to the casing. The electric current passing through the components of the rolling bearing may damage these components, in particular the rolling elements and the raceways formed in the inner and outer rings. The electric shocks may also cause vibrations.

To remedy these drawbacks, it is known to replace the rolling elements of the bearing that are made from the same steel as that of the inner and outer rings with rolling elements made of ceramic. This kind of bearing is generally referred to as a hybrid rolling bearing. However, such a hybrid rolling bearing is relatively expensive.

To remedy the abovementioned drawbacks, it is also known to equip the outer ring of the rolling bearing with an insulating sleeve provided with a bushing and with an insulating insert made of an electrically insulating material and interposed radially between the outer ring and the bushing. In order to fasten the insulating insert to the outer ring and to the bushing without an additional element or particular machining of the outer ring, it is possible to overmold the insulating insert. However, with such a solution, relative detachment of the insulating insert and the bushing may arise during operation.

The present disclosure therefore aims to remedy the abovementioned drawbacks by providing a bearing device of simple and economical design.

SUMMARY

The disclosure relates to a bearing device comprising a bearing having a first ring and a second ring that are able to rotate with respect to one another. The device also comprises at least one insulating sleeve mounted on the second ring of the bearing. The insulating sleeve has a bushing and an insulating insert that is interposed radially between the second ring of the bearing and the bushing. The insulating insert is made of electrically insulating material.

The bushing comprises a cylindrical outer surface and a cylindrical inner surface on the opposite side from the outer surface, which delimit the radial thickness of the bushing.

The insulating insert is overmolded on the second ring of the bearing and at least on one of the outer and inner surfaces of the bushing.

According to a general feature, the surface of the bushing is provided with at least one first groove inside which there extends a first attachment rib of the insulating insert of complementary shape. According to another general feature, the first groove extends circumferentially about a first axis which is offset radially with respect to the axis of the surface of the bushing. This results in a bearing device with integrated electric insulation that is economical compared with conventional hybrid rolling bearings. Moreover, the device is easy to manufacture and fit in the associated electric machine or motor.

Furthermore, providing the groove in the surface of the bushing makes it possible to achieve a firm connection with the insulating insert inasmuch as the attachment rib is formed inside the groove during overmolding.

The risk of relative movements between the insulating insert and the bushing in the axial and circumferential directions is particularly limited in particular under variations in temperature, given the decentering of the axis of the groove with respect to the axis of the surface of the bushing.

The expression "axial direction" means the direction parallel to the rotational axis of the bearing device. The expression "circumferential direction" means the direction which is perpendicular both to the axial direction and to a radius of the bearing device, in other words tangent to a circle the center of which is on the axis of the bearing device.

In one embodiment, the first groove in the surface of the bushing is annular. Alternatively, the first groove could extend circumferentially about the first axis through an angular sector less than 360°.

Preferably, the first groove in the surface of the bushing is situated in the axial midplane, or alternatively in the radial midplane of the bushing.

The bushing may comprise two opposite radially extending axially facing frontal faces which delimit the axial length of the bushing. The first groove in the surface of the bushing may be at a distance from the frontal faces. Alternatively, the first groove may open out axially on one of the frontal faces.

In one particular embodiment, the surface of the bushing is provided with at least one second groove inside which there extends a second attachment rib of the insulating insert of complementary shape. According to a first design, the second groove extends circumferentially about a second axis which is offset radially with respect to the axis of the surface of the bushing.

The second axis of the second groove may be offset radially on the same side as the first axis of the first groove with respect to the axis of the surface of the bushing. Alternatively, the second axis of the second groove is offset radially on the opposite side from the first axis of the first groove with respect to the axis of the surface of the bushing.

According to a second design, the second groove extends circumferentially about the second axis, which is coaxial with the axis of the surface of the bushing.

The second groove may be spaced apart axially from the first groove. Alternatively, the first and second grooves may be contiguous.

In one embodiment, the second groove in the surface of the bushing is annular. Alternatively, the second groove could extend circumferentially about the second axis through an angular sector less than 360°. The second groove may be at a distance from the frontal faces of the bushing. Alternatively, the second groove may open out axially on one of the frontal faces.

In one embodiment, the first groove and/or the second groove may have, in cross section, the shape of a circular arc. In another embodiment, the first groove and/or the second groove may be delimited in the axial direction by two lateral flanks that face one another and have a straight profile in axial section. This makes it possible to further improve the attachment of the insulating insert to the bushing.

According to a first design, the first groove and/or the second groove is delimited in the radial direction by a bottom from which the flanks protrude towards the outside. In other words, each lateral flank forms a change of slope with respect to the bottom in the region in which it is attached to the bottom.

The expression "radial direction" means the direction along a radius of the bearing device, i.e. any direction that intersects the axis of the bearing device and is perpendicular to that axis.

The lateral flanks protrude from the bottom at least along the radial direction. The lateral flanks may protrude from the bottom along a purely radial direction. This further improves the attachment of the insulating insert to the bushing. In a variant, however, it is possible for the lateral flanks to protrude obliquely from the bottom, i.e. both along the radial direction but also along the axial direction.

According to a second design, the first groove and/or the second groove may not have a bottom. In this case, the lateral flanks of the first groove and/or second groove meet and may, for example, extend obliquely.

Independently of the design of the first groove and/or the second groove with or without a bottom, when the lateral flanks extend obliquely, these flanks, as seen in axial section, may be symmetric with regard to a radial plane or asymmetric.

If the insulating insert is made of synthetic material or elastomer material, this makes the device less sensitive to variations in temperature.

In a particular embodiment, the bushing is made of metal material. The bushing can thus be machined easily to a predetermined radial tolerance.

According to an embodiment, a bearing device comprises a bearing including a first ring and a second ring configured to rotate relative to each other about a central axis, the second ring having a first axial end and a second axial end axially spaced from the first axial end and a first radial side extending from the first axial end to the second axial end and a second radial side extending from the first axial end to the second axial end, the second radial side being radially spaced from the first radial side. The device also includes a bushing and an electrically insulating insert overmolded between and connecting the bushing and the second radial side of the second ring. A surface of the bushing facing the second ring includes at least one groove extending circumferentially around a groove axis, at least one rib of the electrically insulating insert extends into the at least one groove, and the at least one groove axis is radially offset from the central axis.

In one embodiment, the insulating insert covers the whole of the surface of the bushing. In this case, the insulating insert entirely covers the surface of the bushing in the axial direction and in the circumferential direction.

According to a first design, the bushing delimits the outer surface of the device. In this case, the second ring is the outer ring of the bearing. According to an alternative second design, the bushing delimits the inner surface of the device. In this case, the second ring is the inner ring of the bearing.

In a particular embodiment, the bearing comprises at least one row of rolling elements disposed between raceways of the first and second rings. The rolling elements may be made of metal material.

The disclosure also relates to an electric motor comprising a casing, a shaft and at least one bearing device as defined above and mounted radially between the casing and the shaft.

BRIEF DESCRIPTION OF THE DRAWINGS

The present disclosure will be understood better from studying the detailed described of embodiments, which are given by way of entirely non-limiting example and are illustrated in the appended drawings, in which.

DETAILED DESCRIPTION

Figure 1:
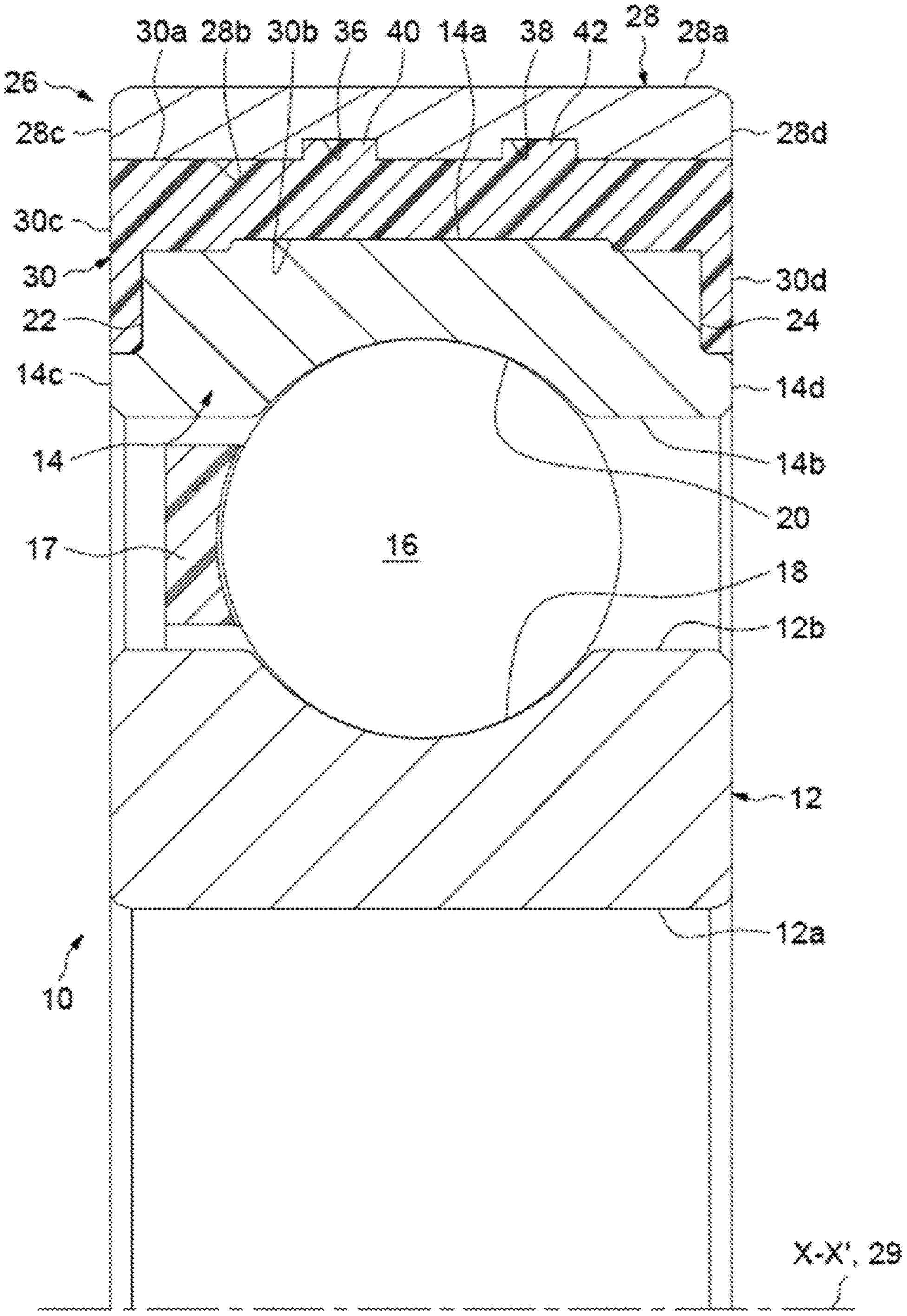
FIG. 1 is a half view in axial section of a bearing device according to one exemplary embodiment of the disclosure.

The bearing device illustrated in FIG. 1 comprises a bearing 10 provided with a first ring 12 and a second ring 14 that are able to rotate with respect to one another about the axis X-X' of the bearing. In the exemplary embodiment illustrated, the first ring 12 is the inner ring of the bearing and the second ring 14 is the outer ring.

The bearing device has been designed so as not to conduct electric currents. The bearing device has integrated electric insulation.

The inner ring 12 and outer ring 14 of the bearing are concentric and extend axially along the axis X-X' of the bearing. The inner ring 12 and outer ring 14 are made of steel. The rings are of the solid type.

In the exemplary embodiment illustrated, the bearing 10 also comprises a row of rolling elements 16, in this case balls, that are interposed radially between the inner ring 12 and outer ring 14. The rolling elements 16 are made of steel. The bearing 10 also comprises a cage 17 for maintaining the regular circumferential spacing of the rolling elements 16. The bearing 10 may also be equipped with seals or flange gaskets.

The inner ring 12 comprises a cylindrical bore **12*a*, a cylindrical axial outer surface 12*b* radially on the opposite side from the bore, and two opposite radial frontal faces (not referenced) that axially delimit the bore and the outer surface. The bore 12*a* and the outer surface 12*b* delimit the radial thickness of the inner ring 12. The bore 12*a*** forms the inner surface of the inner ring.

The inner ring 12 also comprises an inner raceway 18 for the rolling elements 16, which is formed on the outer surface **12*b*. The raceway 18** is directed radially towards the outside.

The outer ring 14 comprises a cylindrical axial outer surface **14*a*, a cylindrical bore 14*b* radially on the opposite side from the outer surface 14*a*, and two opposite radial frontal faces 14c, 14d that axially delimit the bore. The outer surface 14a and the bore 14b delimit the radial thickness of the outer ring 14. The bore 14**b has a stepped shape.

In the exemplary embodiment illustrated, the outer surface 14a of the ring has two different diameters. Alternatively, the outer surface 14a could have a single diameter.

The outer ring 14 also comprises an outer raceway 20 for the rolling elements 16, which is formed on the bore 14b. The raceway 20 is directed radially towards the inside.

In the exemplary embodiment illustrated, a groove 22 is formed in the frontal face 14c of the outer ring. The groove 22 is oriented and open axially towards the outside of the outer ring. The groove 22 has a bottom which is offset axially towards the inside of the ring with respect to the frontal face 14c. The bottom of the groove 22 forms a shoulder. The bottom of the groove 22 extends radially in this case for reasons of ease of manufacture. The groove 22 is annular in this case.

Similarly, a groove 24 is formed in the frontal face 14d of the outer ring. The groove 24 is oriented and open axially towards the outside of the outer ring. The groove 24 has a bottom that is axially offset towards the inside of the ring relative to the end face 14d. The bottom of the groove 24 forms a shoulder. The bottom of the groove 24 extends radially in this case. The groove 24 is annular in this case. The grooves 22, 24 are mutually symmetric with respect to a radial midplane of the outer ring. The grooves 22, 24 axially delimit the outer surface 14a. Alternatively, it could be possible not to provide the grooves 22, 24.

The bearing device also comprises an electrically insulating sleeve 26 mounted on the outer ring 14. The insulating sleeve 26 is mounted on the outer surface 14a of the outer ring 14. The insulating sleeve 26 is secured to the outer ring 14.

The insulating sleeve 26 comprises a bushing 28 and an insulating insert 30 interposed radially between the outer ring 14 and the bushing 28. The insulating insert 30 is overmolded on the outer ring 14 and on the bushing 28.

The bushing 28 has an annular shape. The bushing 28, of axis X-X', extends axially. The bushing 28 is formed in one piece in this case. Alternatively, the bushing 28 could be made in a plurality of pieces bearing against one another, for example two identical pieces. The bushing 28 comprises a cylindrical annular axial outer surface 28a, and a cylindrical annular axial bore 28b which is radially on the opposite side from the outer surface 28a. The bore 28b forms the inner surface of the bushing 28. The bore 28b is oriented radially towards the inside, i.e. towards the outer ring 14. The axis 29 of the bore 28b is coaxial with the axis X-X'.

The bushing 28 also comprises two opposite radial frontal faces 28c, 28d that axially delimit the bore and the outer surface. The frontal faces 28c, 28d delimit the axial length of the bushing. The outer surface 28a and the bore 28b delimit the radial thickness of the bushing 28. The outer surface 28a of the bushing delimits the outer surface of the bearing device 10. In other words, the outer surface 28a defines the outside diameter of the bearing device 10.

In the exemplary embodiment illustrated, the frontal faces 28c, 28d of the bushing are respectively coplanar with the frontal faces 14c, 14d of the outer ring. Alternatively, other arrangements could be provided. For example, the bushing 28 could have a smaller, or larger, axial dimension and be axially set back from the faces 14c, 14d of the outer ring, or protrude from the faces.

Figure 2:
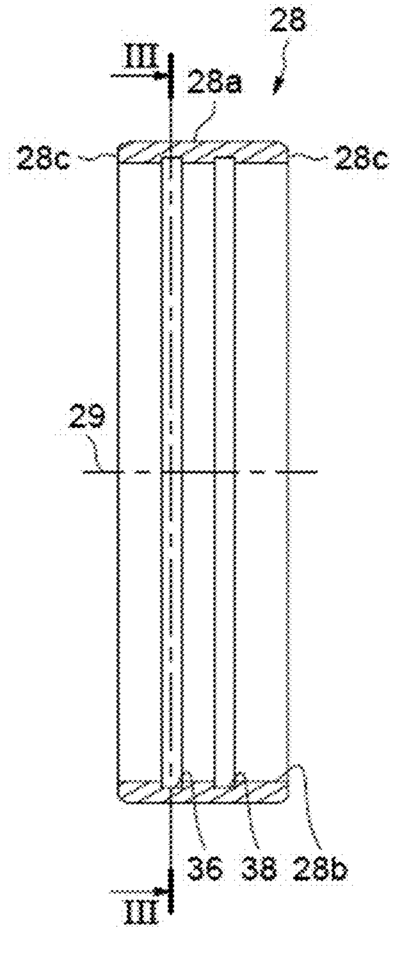
FIG. 2 is a view in section of a bushing of the bearing device from FIG. 1.
Figure 3:
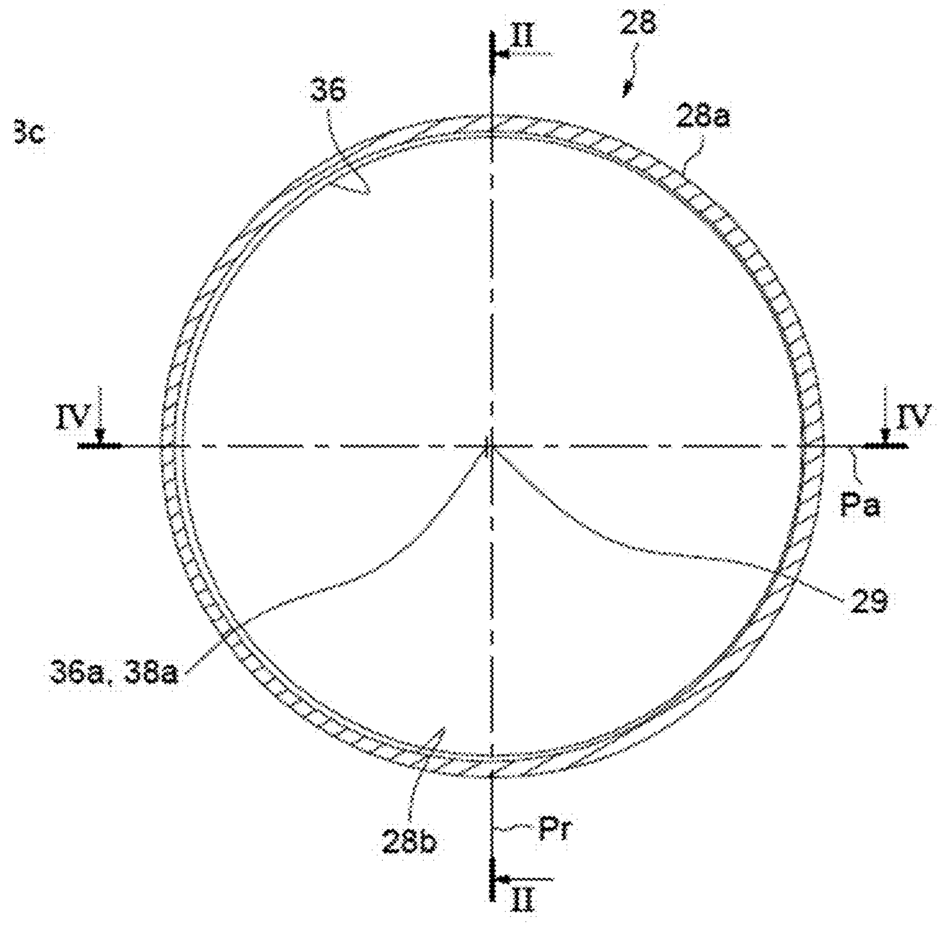
FIG. 3 is a view in section along the line III-III in FIG. 2.
Figure 4:
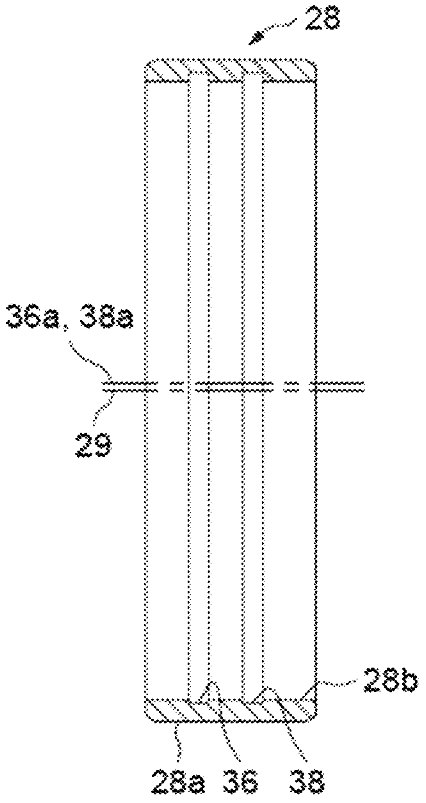
FIG. 4 is a view in section along the line IV-IV in FIG. 3.
Figure 5:
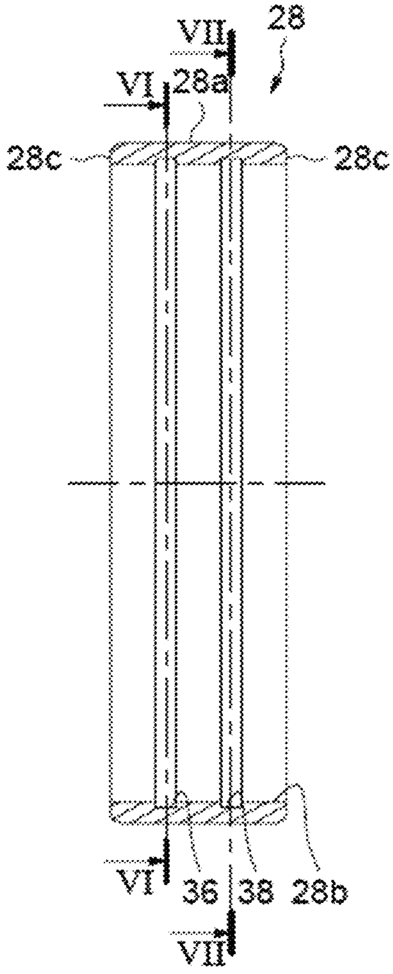
FIG. 5 is a view in section of a bushing of a bearing device according to another exemplary embodiment of the disclosure.
Figure 6:
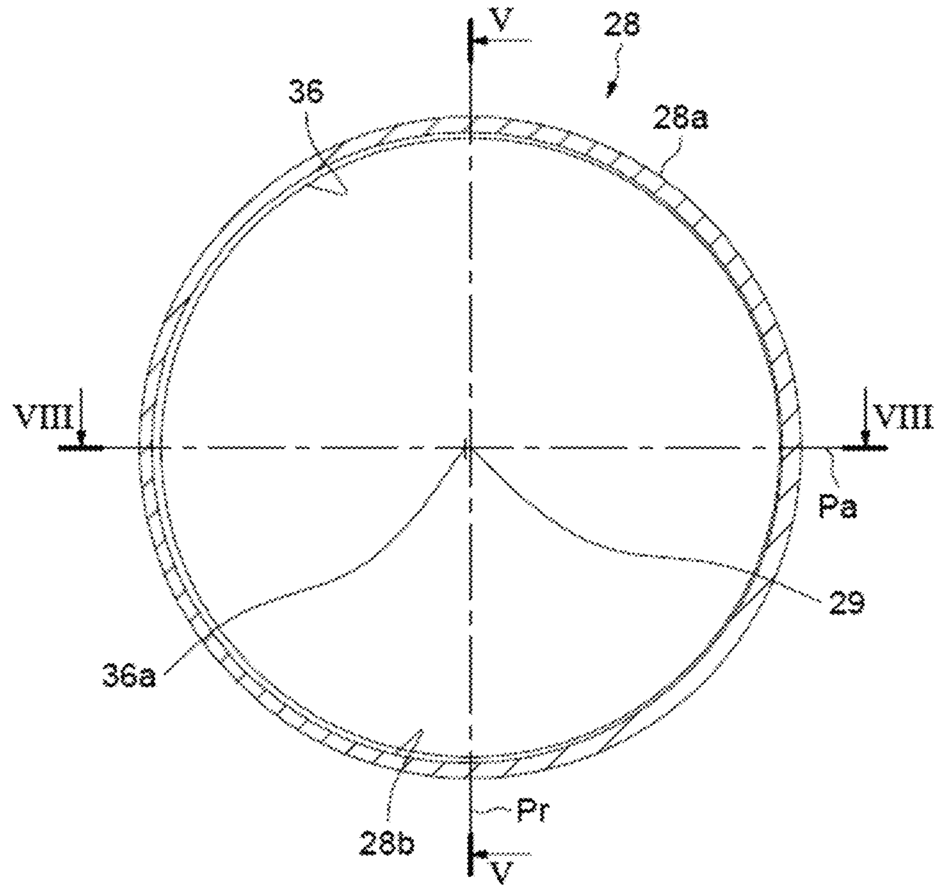
FIG. 6 is a view in section along the line VI-VI in FIG. 5.
Figure 7:
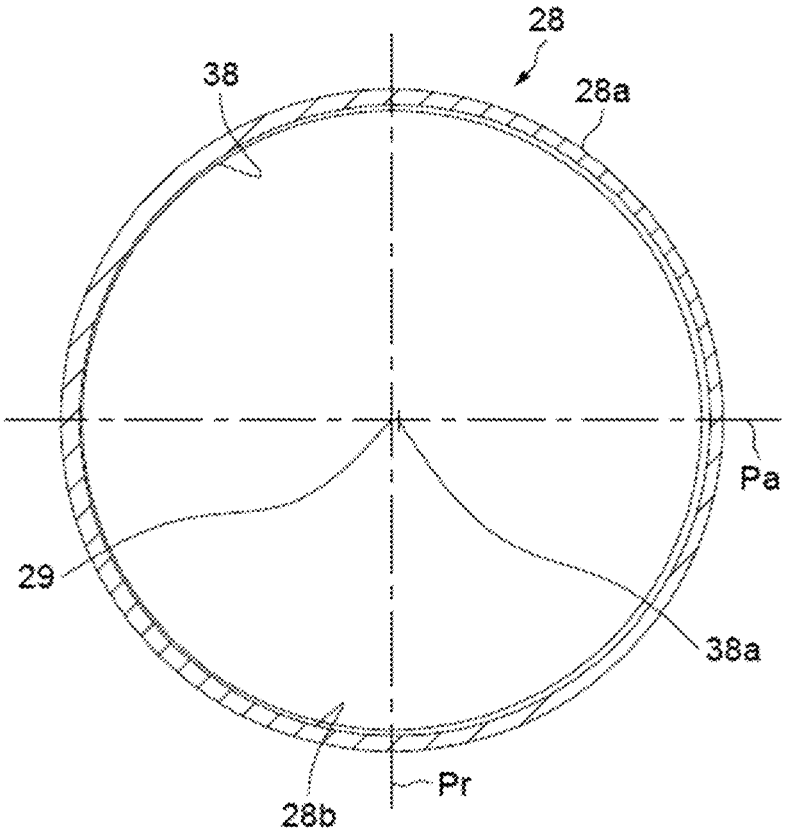
FIG. 7 is a view in section along the line VII-VII in FIG. 5.
Figure 8:
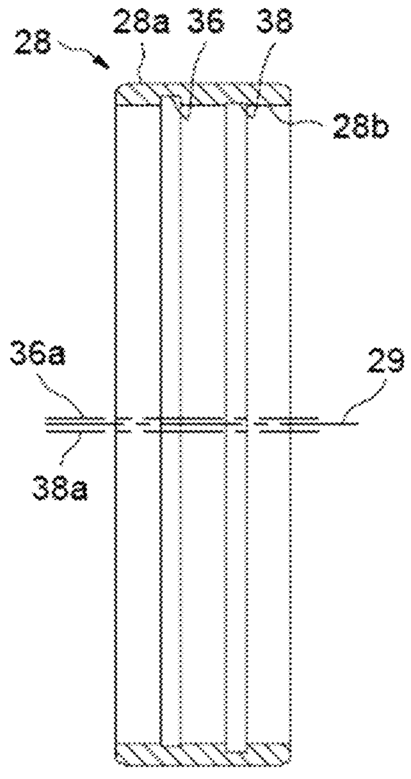
FIG. 8 is a view in section along the line VIII-VIII in FIG. 6.

As can be seen in FIGS. 1, 2 and 4, the bore 28b in the bushing is provided with first and second grooves 36, 38 that are spaced apart axially and extend circumferentially. Each groove 36, 38 is oriented radially towards the insulating insert 30 and the outer ring 14 of the bearing, i.e. radially towards the inside.

In the exemplary embodiment illustrated, each groove 36, 38 is annular. Alternatively, at least one of the two grooves 36, 38 could not extend through 360°.

Each groove 36, 38 is delimited in the axial direction by two lateral flanks that face one another, have a straight profile in axial section and are connected together by an axial bottom. Alternatively, it is possible to provide other shapes, for example grooves that have, in cross section, the shape of a circular arc oriented towards the inside. The bottom of each groove 36, 38 is offset radially towards the outside with respect to the bore 28b in the bushing. The grooves 36, 38 extend into the radial thickness of the bushing 28 and are blind.

The groove 36 extends circumferentially about a first axis 36a which is offset radially with respect to the axis 29 of the bore in the bushing. In the exemplary embodiment illustrated, the axis 36a of the groove is situated in the axial midplane Pa of the bushing 28. Alternatively, the axis 36a could be situated in the radial midplane Pr of the bushing 28.

Similarly, the groove 38 extends circumferentially about a second axis 38a which is offset radially with respect to the axis 29 of the bore in the bushing. The axis 38a is coaxial with the axis 36a in this case. The axes 36a, 38a are situated on one and the same side of the axis 29 of the bore 28b in the bushing.

In the exemplary embodiment illustrated, the grooves 36, 38 in the bore 28b in the bushing are identical to one another. Alternatively, the grooves 36, 38 could, for example, have different diameters and/or different widths.

In a variant, it could also be possible to provide, in the outer surface 14a of the outer ring, at least one groove of the same type as those provided in the bore 28b in the bushing.

The bushing 28 is advantageously made of metal material. The outer surface 28a of the bushing can thus be machined easily to a predetermined radial tolerance, if required. Preferably, the bushing 28 is made of steel. The bushing 28 may be obtained from a sheet metal blank by cutting, pressing and roll bending. Alternatively, the bushing 28 may be obtained from a tube or from forged and/or rolled blanks, or by sintering and stamping. The grooves 36, 38 may, for example, be formed by removing material, for example by machining, or by pushing back material.

The insulating insert 30 is made of electrically insulating material. The insulating insert 30 may, for example, be made of synthetic material, such as PEEK or PA46, or be made of an elastomer material, for example of rubber.

The insulating insert 30 is interposed radially between the outer surface 14a of the outer ring and the bore 28b in the bushing. The insulating insert 30 covers the outer surface 14a of the outer ring. The insulating insert 30 in this case entirely covers the outer surface 14a with regard to the axial and circumferential directions. The insulating insert 30 also covers the grooves 22, 24 in the outer ring. The insulating insert 30 also covers the bore 28b in the bushing. The insulating insert 30 in this case also entirely covers the bore 28b with regard to the axial and circumferential directions.

As indicated above, the insulating insert 26 is overmolded on the outer ring 14 of the bearing and on the bushing 28. The insulating insert 26 is overmolded on the outer surface 14a of the outer ring 14 and on the bore 28b in the bushing 28.

The insulating insert 30 has an annular shape. The insulating insert 30 extends axially. The insulating insert 30 comprises a cylindrical axial outer surface 30a, a cylindrical bore 30*b* radially on the opposite side from the outer surface 30*a*, and two opposite radial frontal faces 30*c*, 30*d* that axially delimit the bore and the outer surface. The radial frontal faces 30*c*, 30*d* delimit the axial length of the insulating insert 30. The outer surface 30*a* and the bore 30*b* delimit the radial thickness of the insulating insert 30. The outer surface 30*a* is in radial contact with the bore 28*b* in the bushing. The bore 30*b* is in radial contact with the outer surface 14*a* of the outer ring, and with the grooves 22, 24. The bore 30*b* has a stepped shape.

In the exemplary embodiment illustrated, the faces 14*c*, 30*c*, 28*c* and 14*d*, 30*d*, 28*d* of the outer ring, of the insulating insert and of the bushing are respectively coplanar.

Alternatively, it is possible to provide other arrangements. For example, the insulating insert 30 could have a smaller axial dimension and be axially set back from the faces 14*c*, 14*d* of the outer ring. Alternatively, the insulating insert 30 could have a larger axial dimension and protrude axially from the faces 14*c*, 14*d* of the outer ring. In this case, the insulating insert 30 may at least partially cover these faces 14*c*, 14*d*. In a variant, the insulating insert 30 could at least partially cover the faces 28*c*, 28*d* of the bushing.

In another alternative or in combination, the bushing 28 could protrude axially from the insulating insert 30 with respect to the faces 30*c* and 30*d*, or be axially set back from these faces.

The insulating insert 30 also comprises first and second ribs 40, 42 that extend radially towards the outside from the outer surface 30*a* and are each housed respectively inside the first and second grooves 36, 38 in the bushing. Each rib 40, 42 protrudes from the outer surface 30*a* of the insulating insert. Each rib 40, 42 has a shape complementary to that of the associated groove 36, 38. Each rib 40, 42 therefore has a radial dimension protruding from the outer surface 30*a* which varies along the circumferential direction. Each rib 40, 42 is formed on the outer surface 30*a* during the overmolding of the insulating insert 30.

In order to manufacture the bearing device, the following method is followed.

In a first step, the bearing 10 and the bushing 28 provided with the first and second grooves 36, 38 are mounted inside a mold which is provided for the overmolding of the insulating insert 30. In this position mounted inside the mold, the bushing 28 is radially at a distance from the outer ring 14 of the bearing.

Next, during a following second step, the insulating insert 30 is overmolded both on the outer ring 14 of the bearing and on the bushing 28. As indicated above, the ribs 40, 42 of the insulating insert are formed during this step.

Lastly, the bearing device, which is in the form of a unitary whole, is removed from the mold.

The exemplary embodiment illustrated in FIGS. 5 to 8, in which the identical elements bear the same references, differs from the first example in that the axis 38*a* of the groove 38 in the bore in the bushing is offset radially away from the axis 36*a* of the groove 36 with respect to the axis 29 of the bore. The axes 36*a*, 38*a* are situated on either side of the axis 29 of the bore 28*b* in the bushing.

The axes 36*a*, 38*a* are situated in this case in the axial midplane Pa of the bushing. Alternatively, the axes 36*a*, 38*a* could be situated in the radial midplane Pr of the bushing 28.

In the exemplary embodiments illustrated, the bore in the bushing is provided with two grooves 36, 38. Alternatively, it could be possible to provide a single groove or at least three grooves in the bore in the bushing.

In the exemplary embodiments illustrated, the first ring 12 of the bearing is the inner ring and the second ring 14, on which the insulating insert 30 is overmolded, is the outer ring.

Alternatively, it is possible to provide an opposite disposition, in which the second ring 14, on which the insulating insert 30 is overmolded, is the inner ring. In this case, the insulating sleeve is situated in the bore 12*a* in the inner ring. The insulating insert is then interposed radially between the bore 12*a* in the inner ring and the outer surface of the bushing. The insulating insert is overmolded on the inner ring and at least on the outer surface of the bushing. The outer surface of the bushing is provided with the groove or grooves, the axis or axes of which are offset radially with respect to the axis of the cylindrical outer surface. The bore in the bushing delimits the bore in the bearing device.

In the exemplary embodiments described, the bearing of the device is provided with a single row of rolling elements. In a variant, the bearing may be provided with several rows of rolling elements. Furthermore, the rolling bearing may comprise other types of rolling elements than balls, for example rollers. In another variant, the bearing may be a plain bearing without rolling elements.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved insulated bearing devices.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A bearing device comprising:

a bearing including a first ring and a second ring configured to rotate relative to each other about a central axis, the second ring having a first axial end and a second axial end axially spaced from the first axial end and a first radial side extending from the first axial end to the second axial end and a second radial side extending from the first axial end to the second axial end, the second radial side being radially spaced from the first radial side, a bushing, and
an electrically insulating insert overmolded between and connecting the bushing and the second radial side of the second ring,
wherein a surface of the bushing facing the second ring includes at least one groove extending circumferentially around a groove axis,
wherein at least one rib of the electrically insulating insert extends into the at least one groove, and
wherein the at least one groove axis is radially offset from the central axis.

2. The bearing device according to claim 1,
wherein the at least one groove is annular and continuous.

3. The bearing device according to claim 1,
wherein the at least one groove is situated in an axial midplane of the bushing.

4. The bearing device according to claim 1,
wherein the at least one groove is situated in a radial midplane of the bushing.

5. The bearing device according to claim 1,
wherein the at least one groove is spaced from a first axial end of the bushing and from a second axial end of the bushing.

6. The bearing device according to claim 1,
wherein the at least one groove comprises a first groove extending circumferentially around a first groove axis and a second groove extending circumferentially around a second groove axis.

7. The bearing device according to claim 6,
wherein the first groove axis is radially offset from the second groove axis.

8. The bearing device according to claim 6,
wherein the bushing is made of metal.

9. The bearing device according to claim 1,
wherein the at least one groove is annular and continuous,
wherein the at least one groove is situated in an axial midplane of the bushing, and
wherein the at least one groove is spaced from a first axial end of the bushing and from a second axial end of the bushing.

10. The device according to claim 9,
wherein the at least one groove comprises a first groove extending circumferentially around a first groove axis and a second groove extending circumferentially around a second groove axis.

11. An electric motor comprising:
a housing,
a shaft, and
at least one bearing device according to claim 10 mounted radially between the housing and the shaft.

12. An electric motor comprising:
a housing,
a shaft, and
at least one bearing device according to claim 1 mounted radially between the housing and the shaft.

* * * * *